Aug. 31, 1965 R. E. OBENHAUS 3,203,083

METHOD OF MANUFACTURING A HERMETICALLY SEALED SEMICONDUCTOR CAPSULE

Filed Feb. 8, 1961 4 Sheets-Sheet 1

Robert E. Obenhaus, Inventor.
Koenig and Pope, Attorneys.

Aug. 31, 1965 R. E. OBENHAUS 3,203,083

METHOD OF MANUFACTURING A HERMETICALLY SEALED SEMICONDUCTOR CAPSULE

Filed Feb. 8, 1961 4 Sheets-Sheet 2

Robert E. Obenhaus
Inventor.
Koenig and Pope,
Attorneys.

Robert E. Obenhaus,
Inventor.
Koenig and Pope,
Attorneys.

Robert E. Obenhaus,
Inventor.
Koenig and Pope,
Attorneys.

3,203,083

METHOD OF MANUFACTURING A HERMETICALLY SEALED SEMICONDUCTOR CAPSULE

Robert E. Obenhaus, South Easton, Mass., assignor to Texas Instruments Incorporated, Dallas, Tex., a corporation of Delaware Filed Feb. 8, 1961, Ser. No. 87,863
4 Claims. (Cl. 29—470.1)

This invention relates to improved methods of encapsulating semiconductor devices and the like, and to transistor or like capsules or packages resulting therefrom having flanged header and cover parts hermetically sealed together between the flanges.

Among the several objects of the invention may be noted the provision of a flanged capsule for semiconductor devices or the like, having an improved bond between its flanges for effecting a hermetic seal; the provision of a method of making a capsule of the class described which employs a solid-phase bond to avoid contamination of the encapsulated semiconductor devices; the provision of flanged capsules of the class described having bonded flanges which are dimensionally uniform; the provision of a process of the class described in which the total squeezing pressure employed for bonding is minimized while at the same time providing the substantial unit pressure required for effectively accomplishing solid-phase bonding; and the provision of a method of the class described which is effective for a wide variety of metals employed for cover and header parts to meet various commercial requirements. Other objects and features will be in part apparent and in part pointed out hereinafter.

The invention accordingly comprises the elements and combinations of elements, steps and sequence of steps, features of construction and manipulation, and arrangements of parts which will be exemplified in the structures and methods hereinafter described, and the scope of which will be indicated in the following claims.

In the accompanying drawings, in which several of various possible embodiments of the invention are illustrated, FIG. 1 is an exploded sectional view of a capsule embodying one form of the invention;

Figure 7:
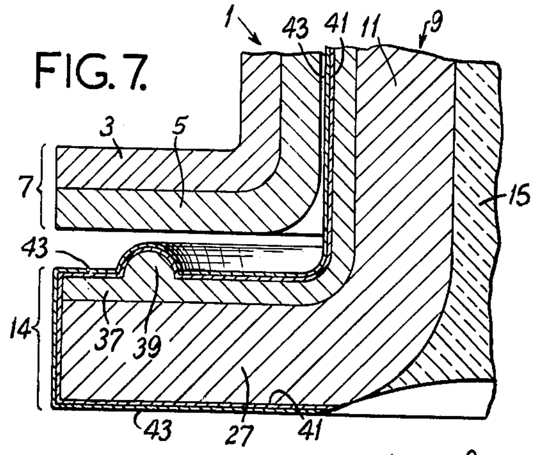
FIGS. 7 and 8 are views similar to FIGS. 5 and 6, respectively, illustrating a modification.
Figure 8:
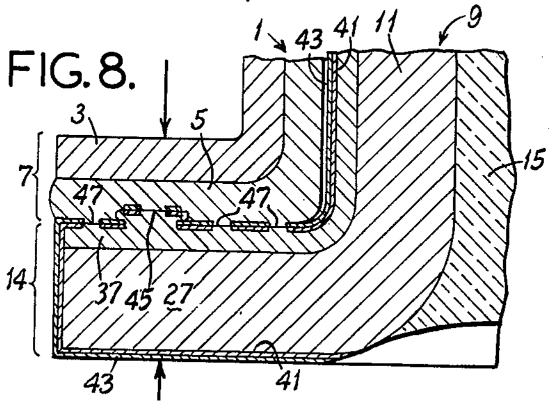
Figure 16:
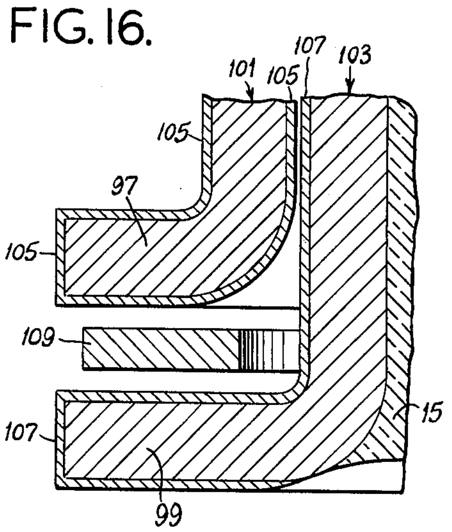
Figure 17:
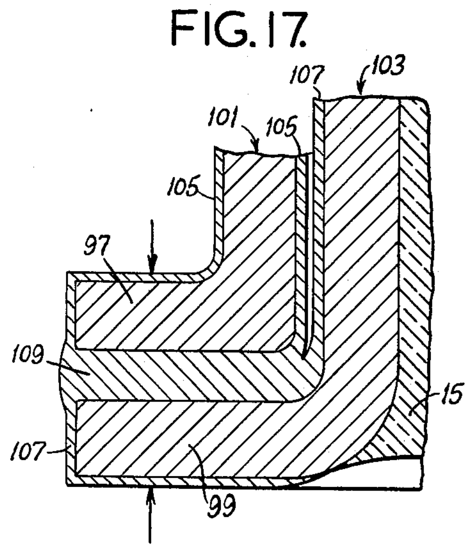
Figure 12:
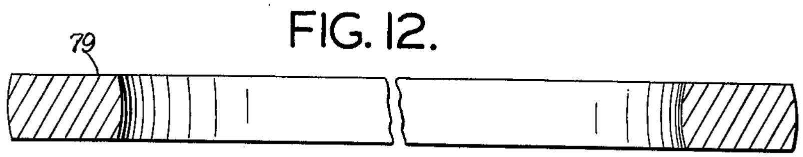
FIG. 12 is an enlarged detail cross section of a ring employed in another form of the invention.
Figure 13:
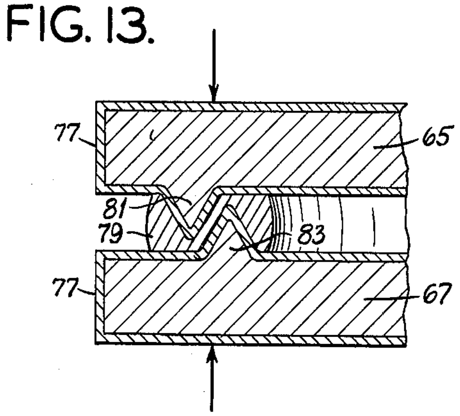
Figure 14:
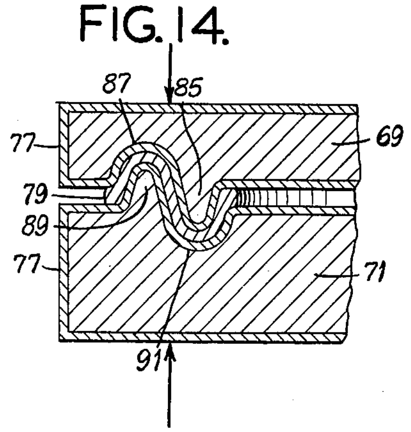
Figure 15:
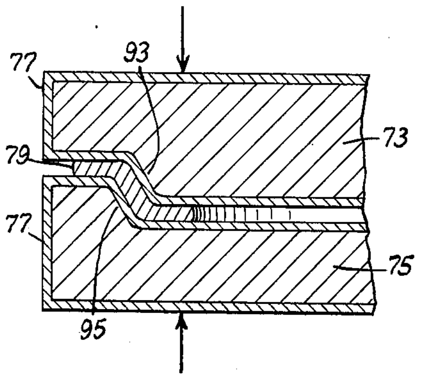

FIGS. 13, 14 and 15 are enlarged detail sections illustrating applications of the ring shown in FIG. 12; and FIGS. 16 and 17 are views similar to FIGS. 7 and 8, illustrating another form of the invention.

Corresponding reference characters indicate corresponding parts throughout the several views of the drawings.

The term metals is used herein in its broad sense including alloys.

Small, thin-walled protective capsules for semiconductors and the like (forming transistor or like packages) are often constructed of a flanged cap or cover and a flanged header, the latter containing a glass seal which in turn carries appropriate terminals forming connections for and/or supporting the semiconductor to be encapsulated. The flanges have heretofore been attached to one another by processes, such as liquid-phase welding, soldering or the like, which generate gases and other undesirable materials which, by sputtering or the like, invade the capsule and have a deleterious effect upon the contained semiconductor. Removal of such materials after invasion is difficult, so that it is preferable to prevent the invading action. The present invention employs a solid-phase bond which avoids the generation of such gases and other undesirable invading materials. Moreover, the present invention makes provision for the effectiveness of the solid-phase bonding method on thin-walled flanges, which are often only a few mils in thickness. It is to be understood, however, that the invention is also useful in respect to thick-walled flanges.

Figures 1, 2, 3:
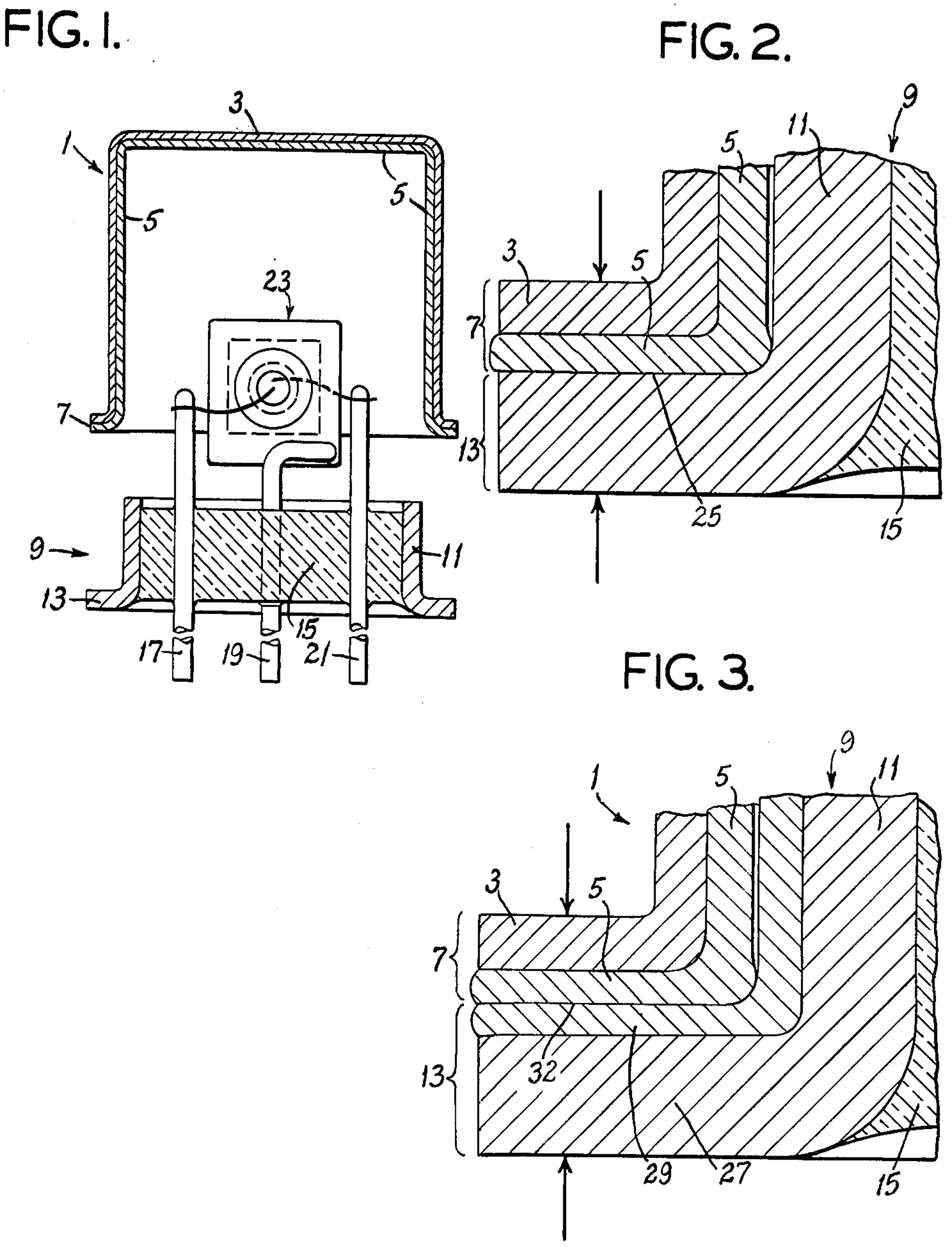
FIG. 2 is an enlarged detail section of a flange portion of the capsule of FIG. 1, shown in sealed condition.
FIG. 3 is a view similar to FIG. 2, illustrating a modification.

Referring now more particularly to FIG. 1, there is shown at numeral 1 a cap-shaped cover which may be composed, for example, of a comparatively hard or rigid outer layer 3 and a comparatively soft malleable inner layer 5. The cover includes at its lower open end the outwardly extending peripheral flange 7, formed of marginal portions of the layers or components 3 and 5. The layers 3 and 5 may be assumed to have been appropriately bonded throughout their interfacial areas by any appropriate metallurgic process such as, for example, either of the solid-phase bonding processes disclosed in United States Patents 2,691,815 and 2,753,623, the teachings of which are incorporated herein by reference. Thus the cover 1 may, for example, have been formed from a piece of solid-phase bonded bimetal. However, metallurgic bonding processes other than solid-phase bonding are not precluded for the manufacture of the bimetal from which the cap per se is formed. The outer layer 3 may be composed of Monel metal, stainless steel or other comparatively hard or rigid metal, for example, five mils thick. The term Monel is a trademark of the International Nickel Company for a number of nickel-copper corrosion-resistant alloys available in wrought and cast iron forms. The inner layer 5 may be composed of copper, annealed nickel, aluminum or like comparatively soft material, for example, five mils thick. The thicknesses of the layers 3 and 5 are not critical. However, transistor devices are in general quite small, and therefore require only thin walls.

Hereinafter, prebonded material such as 3, 5 may be referred to as composite material. The relatively rigid component such as 3 may be referred to as the base metal component, and the component such as 5 may be referred to as the deformable component. The relatively rigid and deformable characteristics of these components 3 and 5 are of importance.

Referring again to FIG. 1, there is shown at numeral 9 a so-called header eyelet consisting of an annular wall 11 from which extends a lower flange 13. The thicknesses of wall 11 and flange 13 are small, for example, ten mils. The material constituting elements 11, 13 should be relatively hard or rigid. If desired, material such as 5 may be prebonded to the material of the header 9, instead of to the material 3 of cap 1. Within the wall 11 is a sealant 15, composed for example of glass. The glass 15 is hermetically sealed to the wall 11 and contains supports and the usual connections 17, 19 and 21 for a wafer structure such as shown diagrammatically at 23. The wafer structure constitutes the semiconductor or like device which is to be encapsulated. In the case of the use of the glass sealant 15, the wall 11 should have a thermal coefficient of expansion approximating that of glass over a substantial temperature range. An appropriate material is Kovar, which is an alloy consisting of 20% nickel, 17% cobalt, 0.2% manganese and the balance iron. Since Kovar is comparatively hard or rigid, so is the integral flange 13.

In order to encapsulate the device 23, the cover 1 and eyelet 9 are telescoped together from the position shown in FIG. 1 to the position shown in FIG. 2. Prior to telescoping, the interfaces between the copper of flange 7 and the Kovar of flange 13 are suitably cleaned as set forth in said patents. A circumferential squeezing pressure is then applied to flanges 7 and 13 throughout their entire annular areas, as illustrated by the darts on FIG. 2. The squeezing pressure and temperature occur under the conditions set forth in either of said patents, which is to say that the layer of deformable material 5 in flange 7 is sufficiently squeezed by the comparatively rigid layers 3 and 13 that the layer 5 will have a transverse flow at the interface 25. This brings about a smearing action exposing virgin metal surfaces against one another under pressure and a resulting so-called solid-phase bond at the interface. This brings about the desired hermetic seal, which is maintained upon release of pressure.

The solid-phase bonding involves no liquid or gaseous phase products which, if they were formed, would enter the interior of the resulting capsule and damage the wafer 23. The comparative softness of the material 5 permits it to flow at the interface 25 so that solid-phase bonding may take place. The comparative hardness of these backing layers 3 and 13 minimizes the reduction in thickness that might otherwise occur therein the preponderating part of the reduction in thickness occurring in layer 5. As a result, the solid-phase bonded flange as shown in FIG. 2 can be counted upon to have a predictable uniform geometric shape in the final product, rather than constituting an irregular flashing or the like. This is an important feature since, in many cases, these devices are miniaturized and have severe over-all dimensional limitations, particularly where they are for military applications.

Referring to FIG. 3, wherein a modification is illustrated, like numerals designate like parts. In this case, not only is the flange component 7 made up of the prebonded base metal backing material 3 and the comparatively soft bond material 5, but the flange component 13 is also so composed by forming the eyelet 9 of a bonded composite or bimetal. Thus in this case, for example, the entire eyelet 9 is formed of bonded bimetal consisting of a base metal layer of comparatively rigid material such as Kovar 27 and an outside layer of comparatively soft bond metal 29, such as copper. Then when the cover 1 (consisting of the bonded composite 3, 5) and eyelet 9 (consisting of the bonded composite 27, 29) are telescoped to bring their flange components 7 and 13 together, an interfacial contact will occur at 32. Then upon carrying out the squeezing step, as suggested by the arrows in FIG. 3, interfacial deformation occurs, as required for solid-phase bonding. The result again is the production of a hermetic seal in a well-formed flange, i.e. one which is exteriorly flat.

Figure 4:
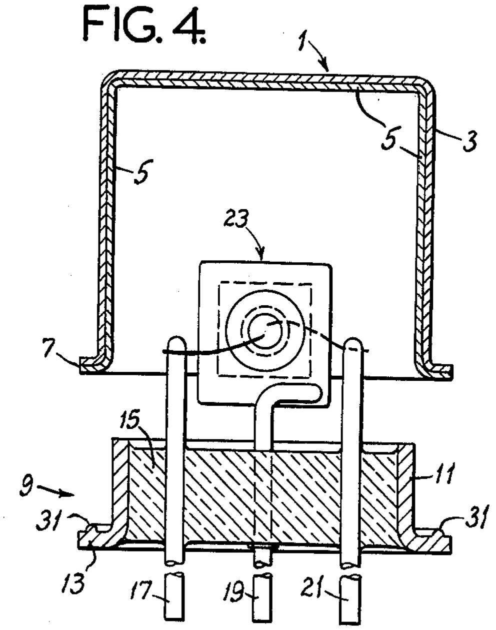
FIG. 4 is a view similar to FIG. 1, illustrating another form of the invention.
Figure 5:
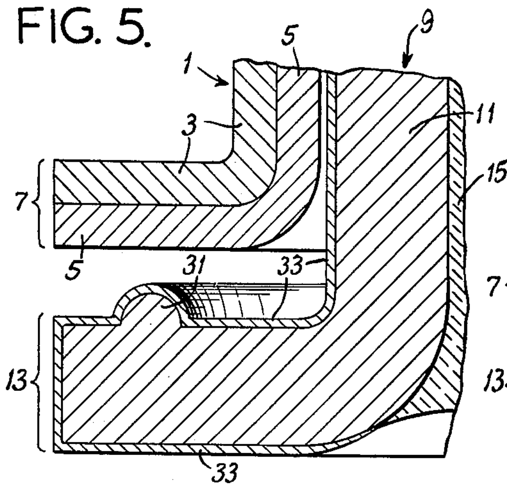
FIG. 5 is an enlarged detail section of flange portions of the capsule of FIG. 4 shown in separated condition.
Figure 6:
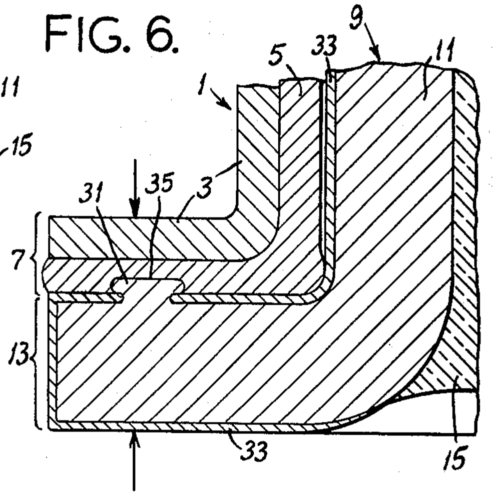
FIG. 6 is a view similar to FIG. 5 but showing the flange portions hermetically sealed.

FIGS. 4–6 illustrate another form of the invention in which like numerals designate like parts. In this case the header eyelet 9, as in FIGS. 1 and 2, has a wall 11 and a flange 13 composed of a rigid base metal such as Kovar. However, the flange 13 is provided with an encircling protrusion or ring 31, and the outside surface of the eyelet 9 not occupied by the glass 15 is provided, preferably by plating, with a layer 33 of a protective material such as gold, for example. This layer is thin, and while it shows in FIGS. 5 and 6, it cannot be seen on the small scale of FIG. 4. Layer 33 is sectioned in FIGS. 5 and 6. This gold layer 33 serves to simplify application to the wafer 23 of an etching material therefor which, without the use of the gold (as in FIGS. 1–3), may attack the Kovar flange 13 or the like enough that the latter requires a careful cleaning after etching before the solid-phase pressure bonding step occurs. Thus, the gold plating allows more freedom in the process of applying the etch to the wafer 23, without attacking the Kovar or the like in flange 13, the gold plate 33 being relatively impervious to the etch.

As illustrated in FIG. 5, the cover 1 and eyelet 9 may be telescoped and this brings the lower surface of the deformable soft metal 5 against the top of the ring 31. Then upon applying a squeezing force such as suggested by the darts in FIG. 6, the hard gold-covered protruding ring 31 first pushes into the layer 5, the latter being forced down by the base metal backing layer 3. Finally the projection 31 becomes flattened and in the process the gold plating wiped from the projection 31 (FIG. 6). The resulting flow assures a solid-phase bond between the exposed virgin hard metal of the ring 31 and the layer 5. Whether or not there is a bond between the layer 5 and the remaining unbroken layer of gold is immaterial, since a hermetic solid-phase bond exists between the flattened gold free protrusion 31 and layer 5. However, if such a bond is desired, it can be obtained by cleaning from the gold prior to squeezing the foreign material thereon resulting from the etching. In general, since the gold is wiped away from the top of the protrusion 31 as squeezing occurs (FIG. 6) the bond-deterrent effect of any uncleaned gold on the protrusion 31 is eliminated.

Another advantage of the use of a bulged protrusion such as 31 is that a high unit pressure is obtained at the interface 35 without the use of unduly large total pressure, forcing the flanges 7 and 13 together. The high unit pressure assures the desired smearing action at the protrusion, whether or not a protective plating is used. Moreover, the high unit pressure permitted by the protrusion is advantageously localized at the area immediately adjacent the protrusion, which is spaced from and remote from the glass or sealant means. This arrangement advantageously avoids, or at least minimizes, the danger of glass breakage due to stresses developed during bonding. This construction also avoids the necessity for providing resilient stress-relieving constructions. In addition, it results in the over-all dimensions of the package being substantially unaltered.

Another advantage of a protrusion such as 31 is that in certain transistor constructions, there is provided a radially projecting tab on the header member which indicates or identifies the relative positions of the base, emitter and collector electrodes to facilitate subsequent proper electrical connections. There are usually (at least in military applications) very strict shape and dimensional limitation requirements for these projecting tabs. If in the bonding process a protrusion such as 31 is not employed, there is a tendency for the tabs to be deformed also during the pressure bonding process. Deformation of the tab also causes weakening and breakage (in some cases) of the tab as well as unfavorable or unacceptable dimensional and shape variations. The protrusions localize the bonding stresses and deformations to the point where the projecting tab is practically unaffected by the bonding process.

In FIGS. 7 and 8 is shown a modification of the form of the invention shown in FIGS. 5 and 6, in which special means are employed, in connection with a bonded protrusion, for obtaining some additional bonding adjacent the protrusion where uncleaned gold or like etch-protective plating is used. Like numerals designate like parts. In this case the eyelet flange 14 is made composite, being composed of a hard or rigid Kovar base metal backing component 27 and a prebonded soft copper or like facing 37, having a soft ring-shaped protrusion 39. In this case, the eyelet 9 is provided on its soft metal layer 5 with a plated layer of frangible nickel 41 and a covering plated layer of gold 43. The platings cover the protruding ring 39. Then when the cover and eyelet parts 1 and 9 are brought from the FIG. 7 to the FIG. 8 position and squeezed, an action is obtained similar to that disclosed in my copending now abandoned United States patent application Serial No. 79,215 filed Dec. 29, 1960, for Encapsulating Method and the Product Thereof, both the gold and the nickel being broken apart as discrete composite units on the top of the protrusion 39 to expose virgin surfaces of the layers 5 and 37 at the interface 45 for solid-phase bonding of virgin metal. Moreover, as disclosed in my above mentioned copending United States patent application for Encapsulating Method and the Product Thereof, there will be a tendency also for the frangible nickel in that flat areas adjacent the protrusion 31 to be broken up under pressure. This in turn breaks up the ordinarily more stretchable gold plating. This exposes virgin surfaces between the layers 5 and 37 to bring about solid-phase bonding. The breaks at which bonding occurs are shown at 47. The combination of the smear action at the interface 45 and the break-up areas such as at 47 brings about an extensive solid-phase bonding area.

Figure 9:
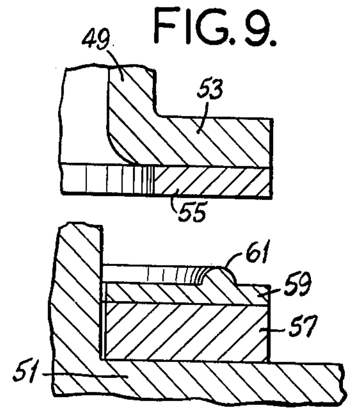
FIGS. 9, 10 and 11 are detail views of flange parts of another form of the invention and illustrating a three-step sequence of operations.
Figure 10:
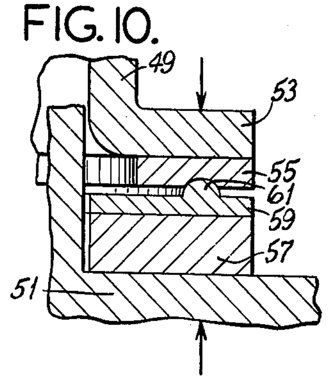
Figure 11:
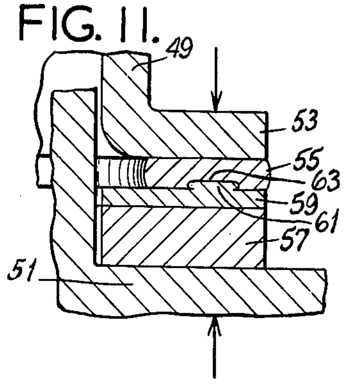

In FIGS. 9–11 is shown a form of the invention in which a Kovar, steel or the like cover component is shown at 49. In this case it is desired to form an encapsulation by sealing this element 49 to a soft copper or like support 51. Sealing is accomplished by attaching to the Kovar flange 53 of the Kovar element 49 a soft metal ring 55, composed for example of copper. Parts 53 and 55 are prebonded.

At numeral 57 is shown a rigid backing ring such as, for example, steel bonded to the copper support 51. Prebonded to the steel ring 57 is a soft metal ring 59 composed, for example, of copper. The copper ring 59 is provided with a circular protrusion 61. Upon moving the assembly 49, 53, 55 toward the assembly 51, 57, 59, the soft copper ring 55 first engages the soft protrusion 61, as illustrated in FIG. 10. At first the protrusion 61 indents the ring 55. Thereafter the protrusion is mashed out, as indicated in FIG. 11. The soft materials flow and smear at the interface and solid-phase bonding takes place, particularly in the area occupied by the deformed protrusion. The hard Kovar member 53 and the hard steel member 57 act as base metal backing layers, and the copper rings 55 and 59 act as the soft smearing layers adapted to expose virgin metal at the interface. A good solid-phase bond or smear weld is assured on which any bond-deterrent films that may have gathered on the rings 55 and 59 are wiped off, particularly at the interface 63 in the region of the protrusion 61.

In FIGS. 12–15 is illustrated another form of the invention in which, in view of what has already been said, only the flanges of the capsules under consideration are illustrated, these being composed of the appropriate hard base metal material such as Kovar, steel or the like. In FIG. 13 such flanges are numbered 65 and 67; in FIG. 14 they are numbered 69 and 71; and in FIG. 15 they are numbered 73 and 75. These flanges may be plated with protective material such as gold or the like, the plating being numbered 77 in these three figures. In FIG. 12 is shown a soft metal ring 79 which is used in connection with the forms of the invention shown in FIGS. 13, 14 and 15. This ring may be composed of copper, aluminum or the like. In FIG. 13, the flanges 65 and 67 are provided with ring-shaped protrusions 81 and 83 which spacedly interdigitate. These are of angular cross sections. The diameter of the ring 79 is such that when interposed between the flanges 65 and 67 it will be located between the protrusions 81 and 83. Under squeezing pressure and the appropriate conditions set forth in said patents, there will result a solid-phase bond or smear weld between the ring and the gold-plated protrusions, and also between the ring 79 and the backing flanges 65 and 67, if gold is smeared from the protrusions 81 and 83. The wiping action affected by the metal flow has a cleaning action which exposes virgin surfaces for the welding process.

In FIG. 14, the flange 69 is provided with a ring-shaped protrusion 85 and a trough 87. Flange 71 is provided with a ring-shaped protrusion 89 and a trough 91. These interdigitate. This shaping maximizes the flow effect so as to favor a smear action for bonding between the ring material and the gold, and also between the ring 79 and the backing flanges 69 and 71, if gold is smeared from the protrusions 85 and 89. In FIG. 15 is shown a modification in which flanges 73 and 75 have conjugate step forms, as shown at 93 and 95, respectively, for deforming the ring 79 with generally the same result as described in connection with FIGS. 13 and 14, when pressure is applied.

In FIGS. 16 and 17 is shown another form of the invention. In this case a hard steel backing flange 97 is provided on a cover which is to be bonded with respect to a hard Kovar flange 99 of an eyelet. The cover element is numbered 101 and the eyelet 103. The cover 101, including its flange 97, may be gold-plated, as shown at 105. The Kovar surfaces of the eyelet 103 not covered by glass may also be gold-plated, as shown at 107. At numeral 109 is shown a gold ring, which is interposed between the plated flanges 97 and 99, as indicated in FIG. 16. When, as indicated by the darts in FIG. 17, pressure is brought to bear under solid-phase bonding conditions, metal flow takes place at the gold interfaces, with the result shown in FIG. 17, in which the gold of the ring 109 becomes solid-phase bonded with the gold plating between the flanges 97 and 99.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

I claim:

1. The method of manufacturing a hermetically sealed semiconductor capsule or the like, comprising forming space-enclosing parts with an outwardly directed circumferential comparatively hard metal flange on each, each of said hard metal flanges being formed with a comparatively soft face-forming metal metallurgically prebonded thereon, one of said flanges having formed in its soft metal face a circumferential protrusion and the other flange being formed in its soft metal face with a nongrooved portion for engagement by said protrusion, bringing said hard flanges together with said prebonded soft metal therebetween, and circumferentially applying opposing forces on the hard metal flanges to force them together to deform the protrusion to effect a solid-phase bond at least in the region of the protrusion.

2. The method according to claim 1, wherein said protrusion includes a part under its soft face-forming metal formed as a raised part of the hard metal of the flange on which the protrusion is located.

3. The method of manufacturing a hermetically sealed semiconductor capsule or the like, comprising forming space-enclosing parts with an outwardly directed relatively hard circumferential metal flange on each, said flanges being formed with comparatively soft first inner layers metallurgically prebonded thereon, the prebonded soft metal layer of one of said flanges being formed with an annular protrusion therefrom covered by a prebonded frangible intermediate layer which is in turn covered by a prebonded second comparatively soft metal facing, the other flange being formed on its soft metal layer with a nongrooved portion for engagement by said protrusion, bringing said hard metal flanges together, and circumferentially applying opposing forces on the hard metal flanges to force them together to deform the protrusion and break up said frangible intermediate layer and facing and to effect a solid-phase bond between said first-named soft metal first inner layers.

4. The method of manufacturing a hermetically sealed semiconductor capsule or the like, comprising forming space-enclosing parts with an outwardly directed circumferential comparatively hard metal flange on each, one of said flanges having a circumferential protrusion extending from its inner face, the other flange being formed with an inner nongrooved portion opposite said protrusion, at least one of said flanges being formed with an inner metallurgically prebonded comparatively soft metal facing in a position to be squeezed by the protrusion when the flanges are pushed together, and circumferentially applying opposing forces on the hard metal flanges to force them together to squeeze said soft metal facing between the protrusion on the one flange and the nongrooved portion on the other flange to solid-phase bond the soft metal to effect a strong hermetically sealed connection between the flanges at least in the region of the protrusion.

References Cited by the Examiner

UNITED STATES PATENTS

| | | | |
|---|---|---|---|
| 312,875 | 2/85 | Marshall | 220—63 |
| 337,720 | 3/86 | Wheelwright | 220—63 |
| 1,299,651 | 4/19 | Anderson. | |
| 1,478,108 | 12/23 | Dieter. | |
| 2,327,259 | 8/43 | Gay | 29—502 |
| 2,608,887 | 9/52 | Sowter. | |
| 2,671,746 | 3/54 | Brew | 29—470.1 X |
| 2,753,623 | 7/56 | Boessenkool et al. | 29—497.5 |
| 2,754,065 | 7/56 | Hawley | 29—470.1 X |
| 2,776,473 | 1/57 | Dailey. | |
| 2,810,873 | 10/57 | Knott. | |
| 2,934,588 | 4/60 | Ronci. | |
| 2,957,236 | 10/60 | Kreuchen | 29—470.1 |
| 2,965,962 | 12/60 | Ollendorf | 29—470.1 |
| 2,973,569 | 3/61 | Feinberg. | |
| 2,975,928 | 3/61 | Roovers | 220—2.3 |
| 3,005,867 | 10/61 | Green et al. | 29—471.7 X |
| 3,024,299 | 3/62 | Nijhuis et al. | 29—470.1 X |
| 3,088,299 | 5/63 | McMahon et al. | 29—423 X |
| 3,106,014 | 10/63 | Brick et al. | 29—482 X |

JOHN F. CAMPBELL, *Primary Examiner.*

EARLE DRUMMOND, *Examiner.*